Aug. 31, 1943.                W. A. DOBSON                2,328,376
                            TYPEWRITING MACHINE
                          Filed Jan. 27, 1941           8 Sheets-Sheet 2

Fig. 2

INVENTOR
WILLIAM A. DOBSON
BY
R. G. Julihn
ATTORNEY

Aug. 31, 1943. W. A. DOBSON 2,328,376
TYPEWRITING MACHINE
Filed Jan. 27, 1941 8 Sheets-Sheet 4

INVENTOR
WILLIAM A. DOBSON
BY
R. G. Julihn
ATTORNEY

Aug. 31, 1943.                W. A. DOBSON                 2,328,376
                           TYPEWRITING MACHINE
                           Filed Jan. 27, 1941           8 Sheets-Sheet 6

INVENTOR
WILLIAM A. DOBSON
BY
ATTORNEY

Aug. 31, 1943.  W. A. DOBSON  2,328,376
TYPEWRITING MACHINE
Filed Jan. 27, 1941  8 Sheets-Sheet 7

INVENTOR
WILLIAM A. DOBSON
BY
ATTORNEY

Aug. 31, 1943.  W. A. DOBSON  2,328,376
TYPEWRITING MACHINE
Filed Jan. 27, 1941  8 Sheets-Sheet 8

INVENTOR
WILLIAM A. DOBSON
BY
R. G. Julihn
ATTORNEY

Patented Aug. 31, 1943

2,328,376

UNITED STATES PATENT OFFICE 2,328,376

TYPEWRITING MACHINE

William A. Dobson, Wethersfield, Conn., assignor to Underwood Elliott Fisher Company, New York, N. Y., a corporation of Delaware Application January 27, 1941, Serial No. 376,045

10 Claims. (Cl. 197—63)

This invention relates to carriage-stop mechanisms for typewriting machines, and more particularly to margin-gaging mechanisms having provision for key setting of margin-defining stops selectively at substantially any letter-space increment of carriage travel.

A margin-stop mechanism for typewriting machines, embodying the desiderata in margin-gaging devices from the standpoint of simple operation, convenience of keyboard control and the economy afforded by a minimum number of parts, preferably includes a series of letter-spaced stops of identical form in a continuous array throughout the range of carriage travel and a stop-setting mechanism operable by a key at the typing keyboard, having a single stop setter operative at a station in fixed position relation with the printing point of the machine to set any one of the stops positioned at said station by carriage movement. In that stops of identical form are preferably employed which stops assume identical positions when set, a single prescribed path is defined by travel of both the right and left margin-defining stops. A single counterstop is arranged in said path and adapted to be engaged respectively by the right and left stops at the corresponding opposite faces of the counterstop. The provision of a margin-gaging mechanism of this character, having a key-operable stop-setting mechanism and stops of identical form throughout the range of carriage travel, entails certain problems in stop setting to adapt any selected one of the stops for either right-hand or left-hand margin gaging.

In view of the foregoing, one of the objects of the present invention is to provide a margin-stop mechanism including simple and reliably operative means by which a selected stop may be rendered effective for either left or right-hand margin gaging.

Another object is to provide a key-settable margin-gaging mechanism in which a series of stops of identical form throughout the range of carriage travel are employed including mechanism responsive to the direction of carriage travel, for adapting a set stop for either left or right-hand margin gaging.

A further object is to provide means associated with the counterstop of a key-settable margin-stop mechanism, by which the normally effective counter-stop is moved out of the carriage-stop path at the instant of stop setting, and is automatically released into said path upon movement of the carriage in either direction, the side of the counterstop at which the set stop is rendered effective being determined by the direction in which the carriage is moved after stop setting, thereby adapting a set stop selectively for either left or right-margin gaging by appropriate movement by the carriage.

In its more specific aspect the invention provides a series of stops arranged at letter-space intervals on the carriage and settable selectively according to the position of the carriage, by a single, key-operable stop setter. The stops may be identical in shape and are settable to identical margin-defining positions for cooperation with a counterstop. A retractable margin counterstop is normally disposed in the path of the set margin stops, any two of which at opposite sides of the counterstop may define a line length of carriage travel. A member or buttress carried on the counterstop is arranged to be engaged by a stop being set, so that in setting the stop, the counterstop is retracted out of the stop path and is so held while the carriage remains stationary. Upon moving the carriage rightward, the set stop moves to the right of the counterstop, riding off the buttress and thus releasing the counterstop to effective position at the left side of the stop. Thereafter, said stop, by its lateral relation to the counterstop, will function to limit leftward carriage travel and thus define the right-hand margin or line-end position of the carriage. Upon moving the carriage leftward after stop setting, the set stop rides off the buttress leftwardly to release the counterstop at its right side, said stop thereafter functioning to define the left-hand margin or the line-start position of the carriage.

The invention is illustrated and described herein in conjunction with a combined margin-gaging and tabulator mechanism forming the subject matter of my copending application, Serial No. 372,622, filed December 31, 1940. Reference is also made to my copending application, Serial No. 376,046, filed January 27, 1941, in which the margin-release and restoring mechanism to allow typing beyond the normal line ends, forms the subject matter described and claimed. As aforeindicated, the subject matter of the present application embraces the features of the invention by which a set stop is adapted selectively for either right or left-hand margin gaging by appropriate movement of the carriage.

In the drawings:

Figure 3 is a transverse sectional view through the mechanism shown in Figure 1, taken on a fore-and-aft plane of the typewriter.

Figures 15 and 16 supplement Figure 14.

Referring now more particularly to Figure 3 of the drawings, a carriage 10 includes spaced end members 11 that are rigidly connected by a carriage bar 12. A platen cylinder 13 extends parallel to the carriage bar 12 and is rotatably mounted in the end members 11. The carriage is guided for line typing and return movement on trackways 14 supported on the main frame 15 of the machine. A spring drum 16 moves the carriage in letter-feed direction under control of a letter-feed escapement mechanism 17 which includes a rocker 18 carrying dogs which cooperate with an escapement wheel 19. The escapement mechanism is carried on a bracket plate 20 extending across the machine and supported on the main frame 15 thereof. The escapement wheel 19 is geared to a rack 21 on the carriage by a pinion 21'. The typing instrumentalities may be of any known kind and may include type bars 23 that are movable against the platen 13 by type keys in the usual manner. The escapement is operated by engagement of the type bars 23 with a universal bar 24 to rock the dog rocker 18 on its pivot 22 at the actuation of the type keys, in the well-known manner. In consequence of each type key operation, the carriage is adavnced step by step at letter spaces to type the characters along a typing line.

*Carriage stop rack*

The stop rack organization illustrated forms the subject matter of my copending application Serial No. 369,467, filed December 10, 1940, now Patent No. 2,317,183, issued April 20, 1943. Briefly, this organization includes a series of letter-spaced, key-settable stops 25 slidably supported on a rack bar 26 mounted on the carriage end members 11. A detent spring 27 extending along the rack bar, coacts with each of the stops to yieldably hold same at retracted, ineffective position, or at either of two effective positions, each stop having a series of detent notches defining said positions.

The lower end of each stop 25 presents two laterally related tabs 28, 29 offset vertically from each other. As shown more clearly in Figure 1, these tabs are each adapted to engage with certain counterstops when set to certain positions. When a stop 25 is lowered the full extent or two notches, the stop is set for margin gaging, the tab 29 being disposed to engage a margin counterstop 30 during carriage travel. When the stop is lowered half way or one notch, it is set to define a tabulator station, the tab 28 thereof being adapted to engage a tabulator counterstop 31 when the latter is raised from ineffective position during a tabulating operation.

*Stop setting*

The stop-setting mechanism includes a stop setter 33 mounted for vertical movement and carrying a finger 34 at its upper end, arranged to overlie the series of stops 25, this finger being adapted to engage any one of said stops positioned thereat in accordance with the position of the carriage at the moment of stop setting. The lower end of the stop setter 33 is flexibly connected to an arm 35 fixed on a rock shaft 36 journaled in brackets 37 of a back plate 38. A lever arm 40 secured to shaft 36, is connected by a link 41 to one arm of a stop-setting lever 42 pivoted at 43, a second arm 44 of which projects forwardly to the keyboard of the machine.

Figures 8, 9, 10, 11, 12, 13:
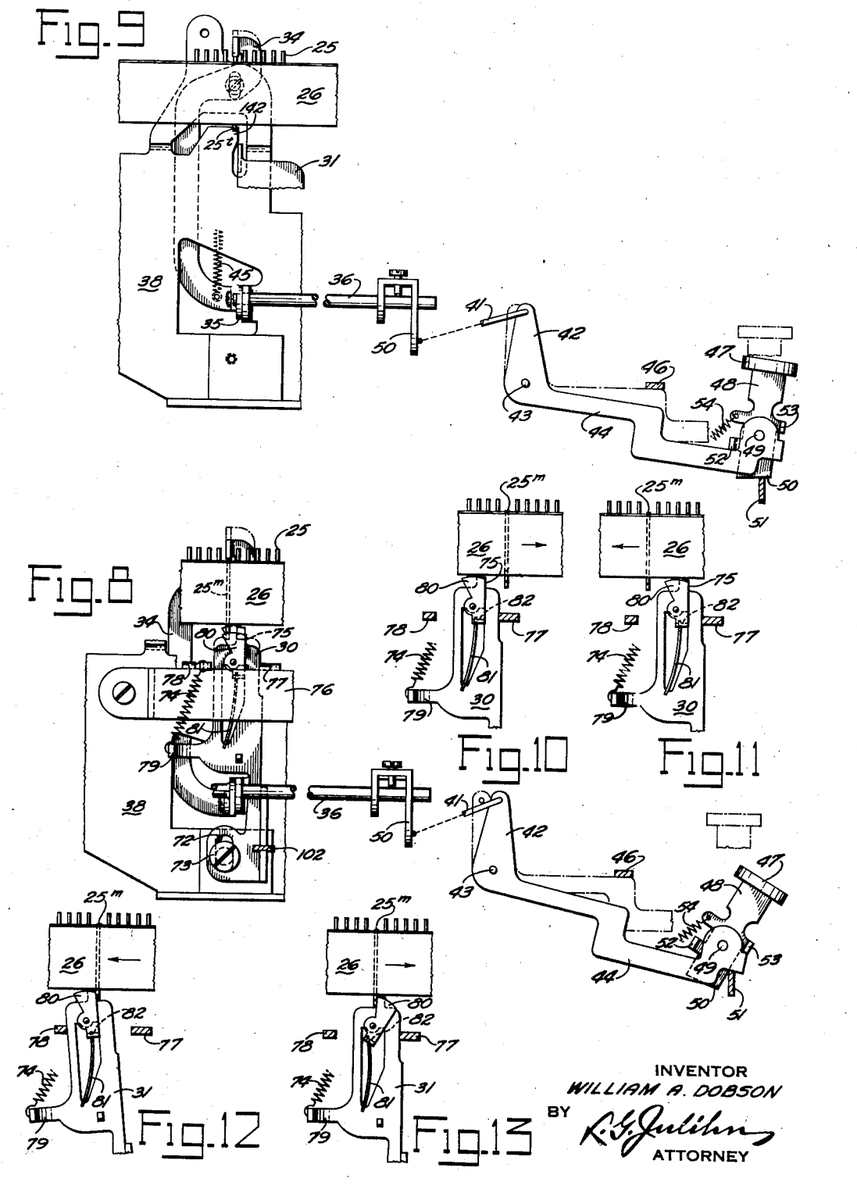
Figure 8 is a fragmentary elevational view illustrating the stop-setting mechanism in operation to set a margin-gaging stop.
Figure 9 is a fragmentary elevational view illustrating the stop-setting mechanism operated to set a stop for tabulating.
Figures 10 and 11 are views supplementing Figure 8, shownig the two positions of a set stop relatively to the margin counterstop upon movement of the carriage in each direction, subsequent to stop setting.
Figures 12 and 13 are elevational views relating respectively to Figures 10 and 11 and illustrating the coaction of the right and left margin-gaging stops with the margin counterstop in each direction of carriage movement.

A spring 45, acting on the stop setter 33, yieldably holds the setting mechanism in normal, inactive position at which the lever 42 engages a member 46 on the machine frame, see Figures 8 and 9. A stop-setting key 47 is carried on a stem 48 pivoted at 49 on the lever arm 44 adjacent the forward end thereof. The key stem 48 projects downwardly and provides a gaging stop 50 at its lower end adapted to engage a member 51 of the machine frame. The key stem 48 includes two laterally projecting lugs 52, 53 on opposite sides of the stem pivot 49 and adapted to engage different portions of the lever arm 44. A spring 54, connected between the stem 48 and arm 44, yieldably holds the key stem in normal, upright position defined by the engagement of lug 52 with the arm 44. In said position, the gaging stop 50 comes into engagement with the member 51 when the stop-setting key 47 is pressed directly downward. By such operation, the stop setter is drawn downwardly only half of its full extent of movement, thereby setting the stop 25$^t$ for tabulating, all as shown in Figure 9. To set a stop 25 for margin gaging, the key 47 is pressed downwardly and also urged forwardly against the tension of spring 54 until lug 53 engages the lever arm 44 thereby moving the gaging stop 50 to a position clear of the member 51. By operating the stop-setting key 47 in this manner, as illustrated in Figure 8, the stop setter 33 is lowered to the full extent determined by engagement of lever arm 44 with the member 51 and thus moves a stop 25$^m$ a corresponding degree, setting same for margin gaging.

*Stop restoring*

The stop-restoring mechanism includes a stop restorer 57 guided for up-and-down movement on the plate 38 by a stud-and-slot mounting 58. The restorer 57 has a pin-and-slot connection adjacent its lower end to an arm 60 of a rockable member 61 pivotally carried on the shaft 36 and including a second arm 62 connected by a link 63 to a stop-restorer button 64. The button 64 is slidable in a front plate 65 of the machine and includes a shoulder 66 abutting the back of said plate. A spring 67, acting on the rockable member 61, restores the mechanism to normal position, with the stop-restorer 57 retracted. The upper end of the stop restorer 57 carries a projecting portion 68 presenting an inclined face 69 and a horizontal face 70, the face 69 rising in carriage-return direction.

Figures 14, 15, 16:
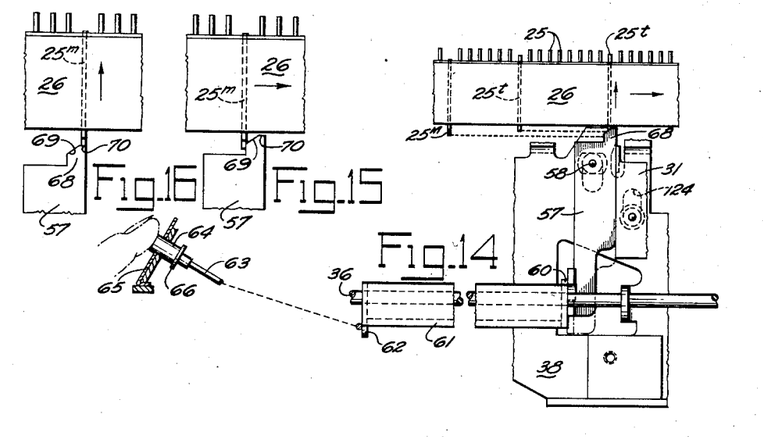
Figure 14 illustrates the operation of the stop-restoring mechanism to restore a series of stops set for tabulating, during a carriage run.
Figure 15 shows a margin-gaging stop abutting the stop restorer without disturbing the former, during a carriage run to restore the tabulator stops.
Figure 16 shows the stop restorer in readiness to restore a margin-gaging stop.

The operation of the stop-restoring mechanism to restore any set tabulating or margin-gaging stop individually, or restore all of the tabulator stops during a carriage run, is illustrated in Figures 14 to 16. To concomitantly restore all of the set tabulator stops, the carriage is brought to line-end position, as by banking against the right-hand margin stop. The restorer button 64 is then pressed and held down while the carriage is actuated through a return movement. As shown in Figure 14, each tabulator stop comes into engagement with the inclined face 69 on the stop restorer and is cammed upwardly thereby into its ineffective position on the stop rack. The restoration of any stop individually, whether for tabulating or margin gaging, may be effected by first banking the carriage at the position of the stop to be restored. Said stop is thus positioned directly over the horizontal face 70 of the stop restorer, as shown in Figure 16, and, by pressing the restorer button 64, the face 70 is brought against the bottom edge of the stop, raising same to ineffective position in the rack.

*Margin-stop selection*

Any stop set for margin-gaging may function either as a left-hand stop to determine the beginning-of-line position, or as a right-hand stop to determine the line-end position of the carriage. The selection of this alternative function of the set stop is made by selecting the direction in which the carriage is moved following the margin stop setting operation. In other words, after setting any one of the stops 25 for margin gaging, the carriage may be moved to the left, putting the set stop at the left of the margin counterstop 30, so that said stop will thereafter determine the beginning-of-line position of the carriage. Inversely, when the carriage is moved to the right after stop setting, the set stop is positioned on the right side of the counterstop 30 for determining the line-end position of the carriage. Thus, alternative relative positions of the set stop and the counterstop are determined by moving the carriage in the appropriate direction after setting the stop.

Figure 2:
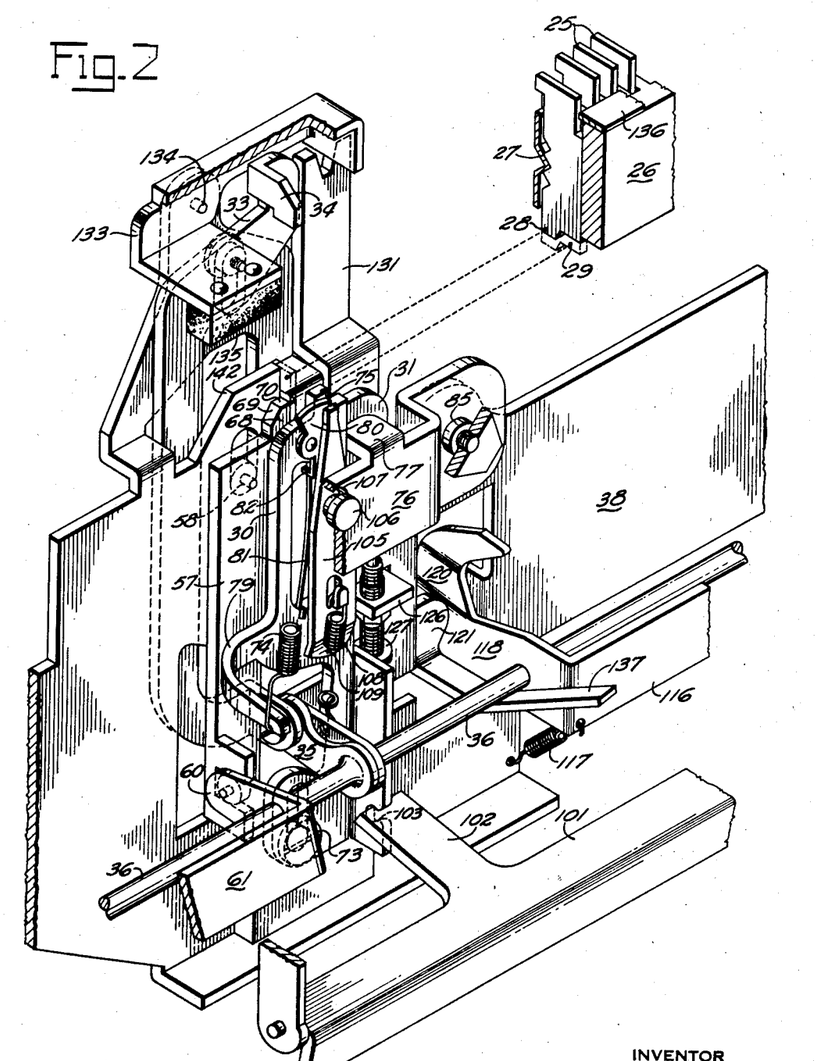
Figure 2 is a view similar to Figure 1 but illustrating only that portion of the mechanism including mainly the counterstops, stop restorer and stop setter.
Figures 4, 5:
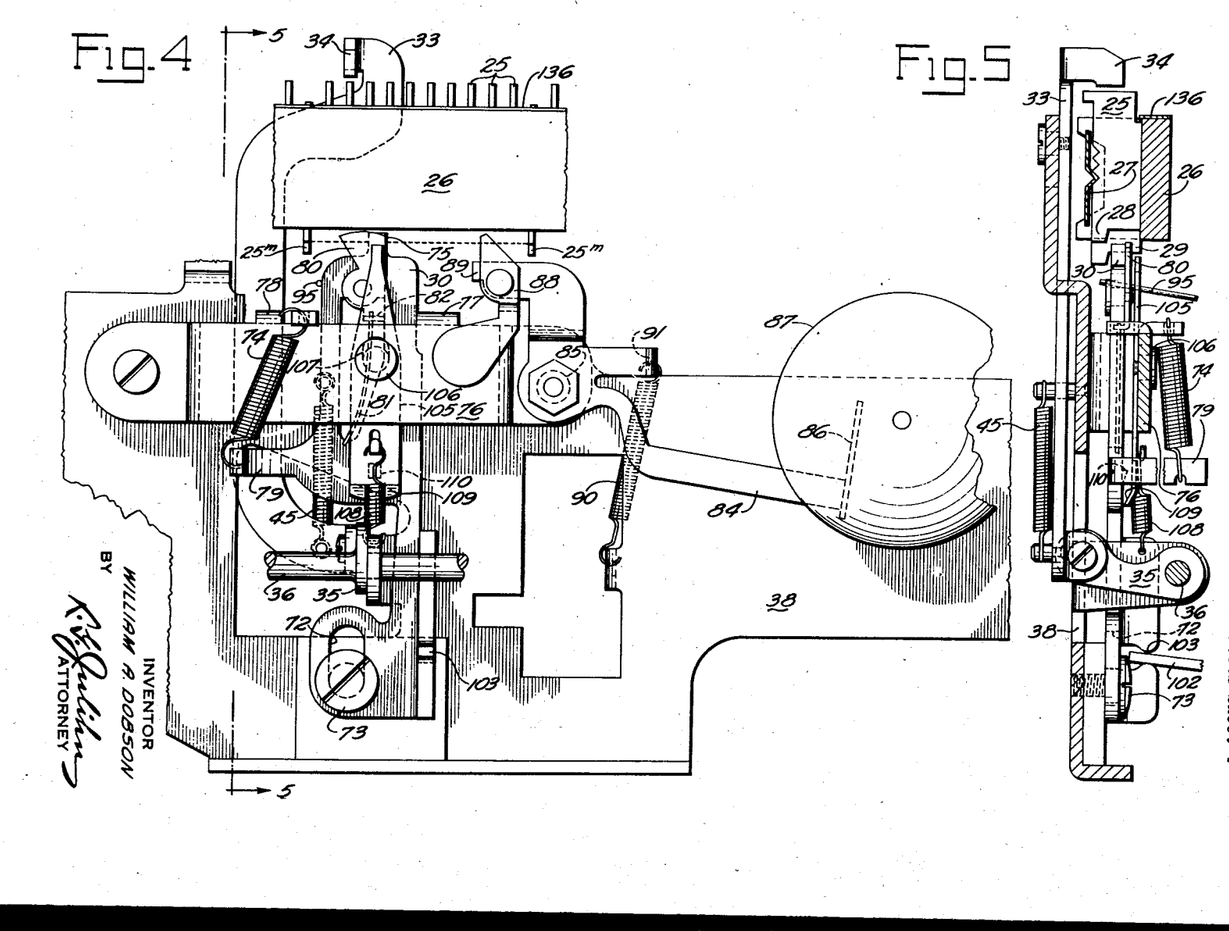
Figure 4 is an enlarged front elevation of the margin-gaging mechanism, omitting other associated mechanisms to facilitate illustration.
Figure 5 is a transverse sectional view of the margin-gaging mechanism, taken on a line 5—5 of Figure 4.

As shown more clearly in Figures 2, 4, and 5, the margin counterstop 30 is mounted for up-and-down and lateral movement. A slot 72 adjacent the lower end of the counterstop rides on a stud 73 carried on the plate 38. A spring 74 yieldably holds the counterstop in normal, raised position, determined by engagement of the end of slot 72 with the stud 73. In said raised position, a projection 75 on the counterstop 30 is in the path of the margin-set stops to intercept the tabs 29 thereof. The counterstop may oscillate about the stud 73 laterally, that is, in the plane of carriage movement, between certain limits which determine two effective positions of the counterstop illustrated respectively in Figures 12 and 13. A yoke-like bracket 76, secured at each end to the plate 38, straddles the counterstop 30 and other elements associated therewith, and has two bent-off lugs 77, 78 adapted to be engaged by the sides of the counterstop 30 when the latter is swung to either of said positions. The spring 74, acting on an off-set arm 79 of the counterstop 30, exerts its force in such direction as to hold the counterstop in normal, upright position against the lug 77, see Figure 13, in which position the counterstop remains when arresting the carriage in rightward travel, at the beginning of a typing line. In arresting the carriage in line-end position, the margin-gaging stop, being intercepted by the counterstop 30, causes the counterstop to swing against the lug 78. This swinging movement is employed to operate a line-lock device, hereinafter described, but is primarily intended to assure a corresponding arrest position of the margin-gaging stop 25, whether functioning for left or right margin gaging. This position, hereinafter referred to as the "stop station," is that at which the stop-setting finger 34 and the stop restorer face 70 are also disposed, so as to set or restore any stop brought to that station by carriage movement.

As aforeindicated, means is provided by which a set margin stop may assume its effective position at either side of the margin counterstop 30. A buttress 80 is pivotally mounted on the counterstop and is arranged to overlap the projection 75 thereof and extends to the left beyond said projection into the mentioned "stop station," with the counterstop 30 in its normal position, see Figure 4. The top edge of the buttress is arcuate on a radius from its pivot center so as to clear the stop rack bar 26 in all angular positions and is positioned just above the top of the counterstop projection 75. The buttress 80 is yieldably held in normal position by a spring 81 interposed between a lower arm of the buttress and the counterstop, at which position, a lug 82 on the buttress engages an inner edge of the counterstop.

The function and operation of the buttress 80 in setting the stops for margin gaging is illustrated in Figures 8, 10 and 11. At the moment of setting a stop, the margin counterstop 30 is in its normal, rightward position, and the buttress is in its normal, leftward position, projecting into the "stop station." As the stop-setting mechanism is operated, as shown in Figure 8, to set a stop for margin gaging, the stop being lowered engages the buttress 80 and the counterstop 30 is thus retracted to the position shown in full line, against the tension of spring 74. If the set stop is intended for right-hand margin gaging, the carriage is moved to the right and the set stop, riding along the top edge of the buttress or swinging the buttress with it, travels to the right side of the projection 75, in which position the counterstop is released to assume its normal position under influence of spring 74. When it is intended that the set stop function to gage the left margin, the carriage is moved to the left after setting the stop, and the counterstop is thus released to normal position with the stop to the left of the projection 75. The buttress 80 is pivotally mounted in order that same may swing out of the way when the mechanism functions to gage a left-hand margin, see Figure 13, so that the left-hand stop may directly engage the margin counterstop. For right-hand margin gaging, the buttress remains in normal position, while the margin counterstop 30, carrying the buttress with it, swings to the position shown in Figure 12. By this procedure, a stop 25$^m$ is set for margin gaging adjacent each end of the carriage and defines a line-typing zone between these stops, into which zone the counterstop 30 projects for interception of the margin-gaging stops 25$^m$ moving with the carriage in either direction.

Line-end signal

The mechanism for signalling the approach of a typing line end is shown in Figure 4. A lever 84 pivoted on a stud 85 carries a hammer 86 adapted to strike a bell 87. An arm of the lever pivotally carries a tripper dog 88 weighted to normally rest against a stop 89 with its upper portion projecting into the path of the margin stops 25$^m$. A spring 90 urges the lever to the bell-striking position shown, at which a lug 91 engages the plate 37. The dog 88 is positioned a suitable number of letter spaces ahead of the counterstop 30 and, as the right-hand stop 25$^m$ moves leftward in line typing, it engages the inclined face of the dog 88, raising the hammer 86 and then releasing same to strike the bell under influence of spring 90. During carriage return, the dog 88 is swung clockwise by the passing margin stop 25$^m$, while the lever 84 remains inactive.

Line locking

Figures 19, 21, 22:
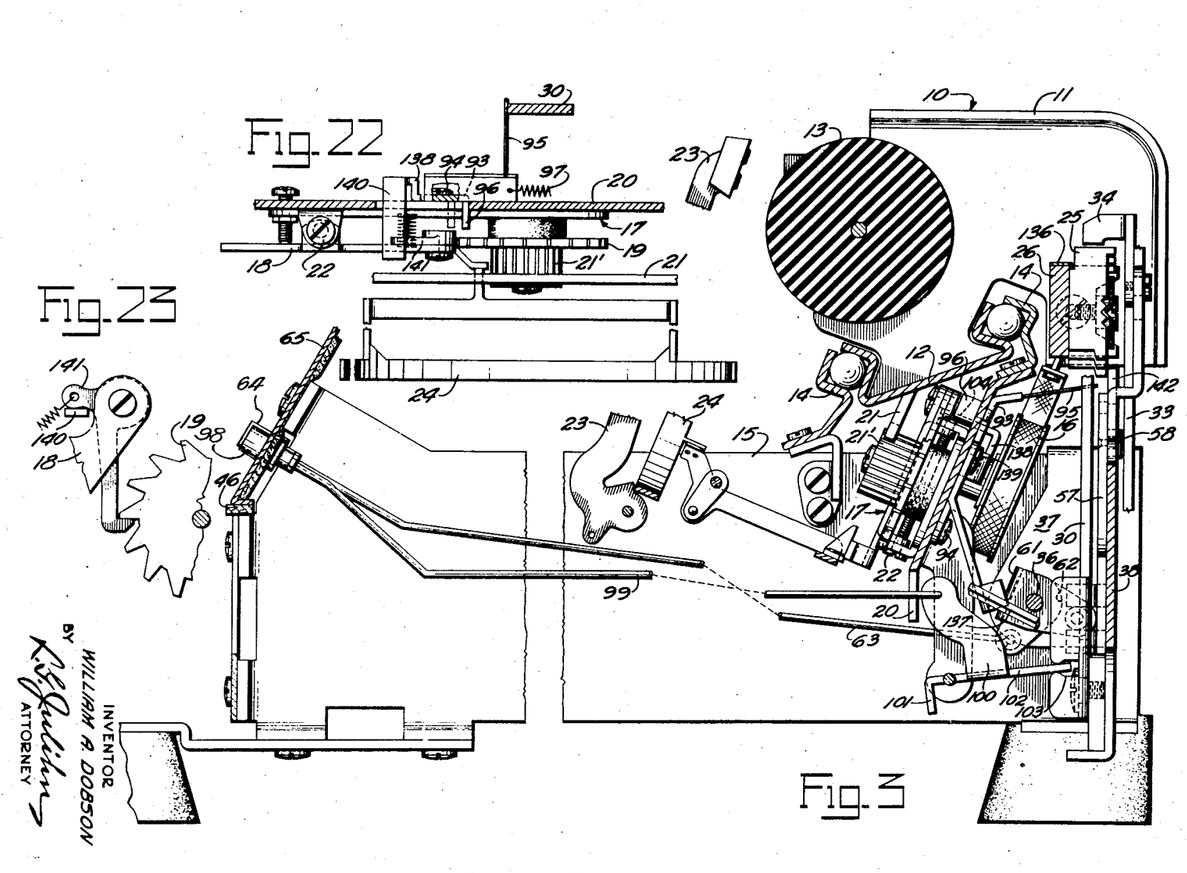
Figure 19 shows the margin-release mechanism in the initial stage of restoring the counterstop for its normal margin-gaging function, after typing beyond the right margin.
Figure 21 illustrates the tabulator mechanism operated to institute a carriage run, with a set tabulator stop approaching engagement with the raised tabulator counterstop.
Figure 22 is a plan view of the letter-feed escapement mechanism, also showing portions of the mechanisms for line locking and carriage release, and, Figure 23 is a fragmentary front elevation of the escapement mechanism.
Figure 19:
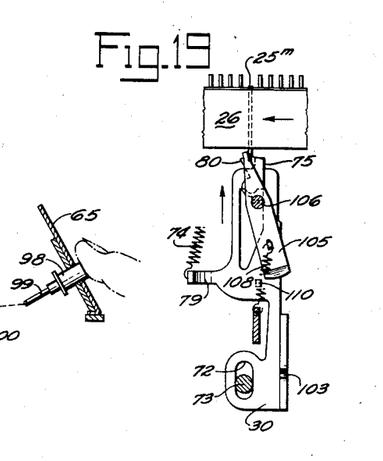

The mechanism for locking the machine at the end of a type line is shown best in Figures 3, 4 and 22. As previously described, the counterstop 30 is swung to the position shown in Figure 12 when the carriage is arrested at the typing line end, which movement operates the line-lock mechanism. A lever 93, Figure 3, is pivoted at 94 on the bracket plate 20 and has a yieldable end portion or spring 95 engaging the left side of the counterstop 30, see Figure 22. Lever 93 reaches through an aperture in the plate 20 and carries a lug 96. During line typing, the dog rocker 18 is oscillated on its pivot 22 for the letter-feed control of the carriage. The counterstop 30, being in its normal upright position, Figure 13, leaves the lever 93 in normal, ineffective position at which lug 96 is free of the dog rocker 18, the lever 93 being restored to normal position by a spring 97. As the counterstop 30 is swung to the Figure 12 position, lever 93 is actuated and the lug 96 thereof is brought to position to obstruct the dog rocker, thereby holding the universal bar 24 immovable and preventing the type bars 23 from completing a typing stroke.

Margin release

Figure 1:
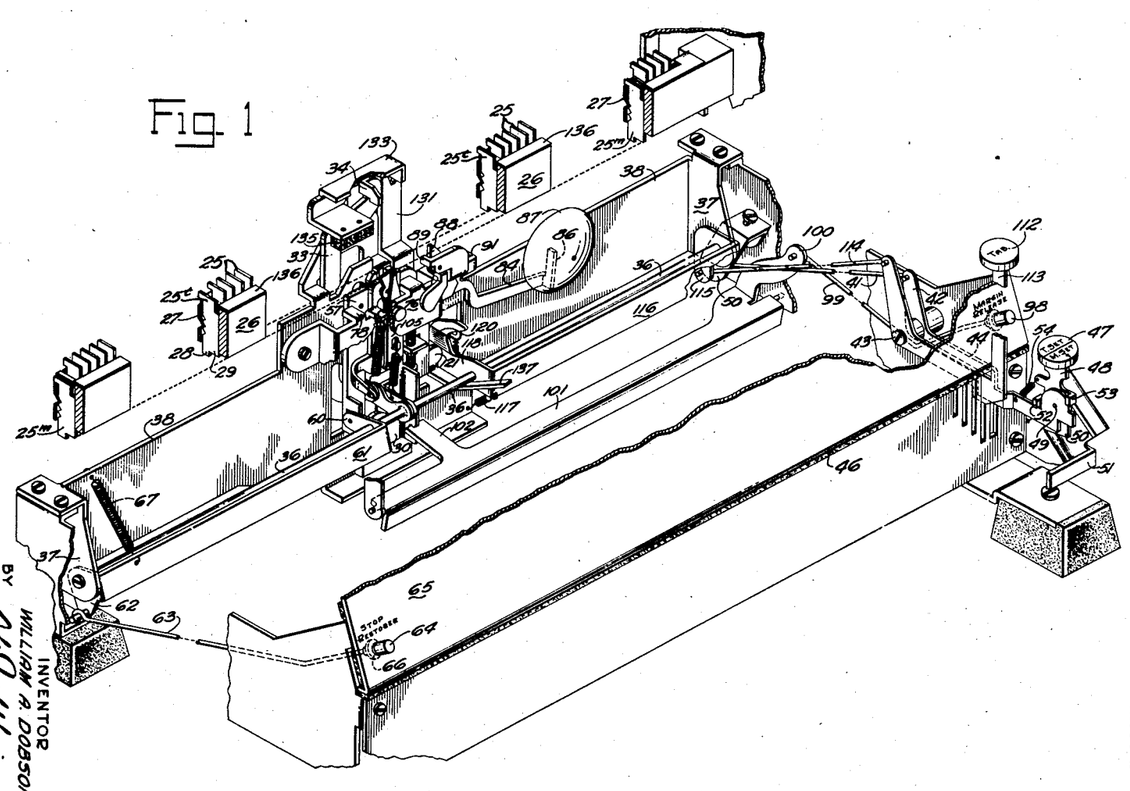
Figure 1 is a perspective view illustrating the combined margin-gaging and tabulator mechanism of the invention.

When it is desired to type beyond either margin, a margin-release button 98 is depressed, which retracts the margin counterstop 30 from the path of the margin stop 25$^m$ to permit passage of the latter to the opposite side of the counterstop. As shown in Figures 1 and 3, a push rod 99 is issuing from the release button 98 is flexibly connected to an arm 100 of a rockable member 101 rotatably mounted by trunnions journaled on the main frame and a bracket hanging from the plate 20, Figure 3. A second arm 102 of the rockable member is loosely engaged at its free end in a slotted ear 103 at the lower end of the margin counterstop. As the button 98 is pressed, the arm 102 swings downwardly, thus retracting the counterstop from effective position.

Figure 17:
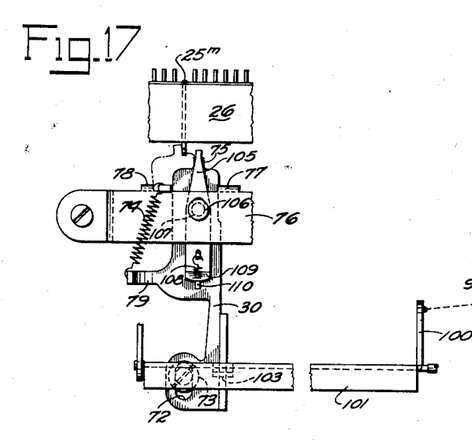
Figures 17 and 18 are similar views illustrating the margin-release mechanism operated to allow for typing beyond a margin and show, in Figure 17, the mechanism in initially operated position after depressing the margin release key, and in Figure 18, the final position of the mechanism after release of said key.
Figure 18:
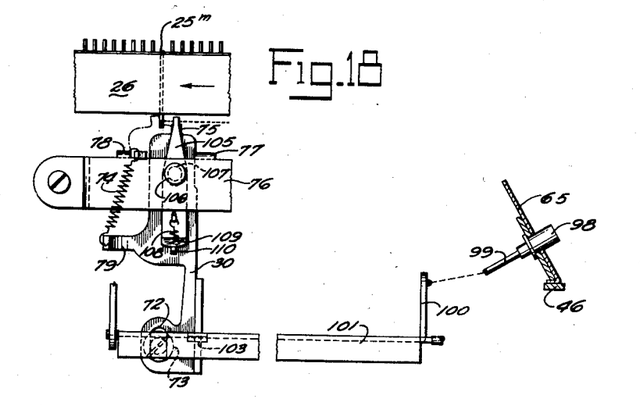

Mechanism is provided for holding the counterstop retracted during margin typing, and for automatically releasing the counterstop when the carriage is restored to the line-typing zone. A resilient latch member 105, preferably in the form of a flat spring, is mounted for pivotal and endwise movement by a headed stud 106 secured to the latch member and engaged in a vertically elongate slot 107 in the bracket 76. A tension spring 108 yieldably holds the latch member down, with the stud 106 bottoming in the slot. The spring 108 is arranged to exert its force on the latch 105 in a substantially perpendicular line from the center of stud 106 so as to yieldably hold the latch in a normally upright position, see Figure 4. The lower end of the latch 105 is bent at an angle inclining toward the counterstop 30 to provide a bevel 109. As the counterstop is retracted, a catch 110 thereon, Figure 5, cooperating with the bevel 109, flexes the latch 105 outwardly until the catch 110 is engaged under the bottom end of the latch. This condition of the mechanism is illustrated in Figure 17 and is a result of pressing the release button 98, before releasing same, and may follow from either condition of the stop mechanism shown in Figures 12 and 13. From the Figure 13 position, the counterstop 30 is merely retracted until latched down, without varying from its upright position. When the counterstop 30 is positioned as at Figure 12, the line-end-defining position, the initial retraction of the counterstop withdraws same from the margin stop, immediately following which the counterstop assumes an upright position against the lug 77, under influence of spring 74. Further retraction of the counterstop completes the latching, as described. When latching is completed, as shown in Figure 17, the button 98 is released and the counterstop is pulled upwardly by its spring 74, carrying with it the latch 105. It may be here noted that in retracting, the counterstop is lowered a distance twice that necessary to clear the margin stop 25$^m$ and that the clearance afforded by the slot 107 is equal to only half the retractive stroke of the counterstop. When the counterstop is raised after latching, the stud 106 engages the upper end of the slot and thus gages the position of the counterstop so that its upper end is still below the path of the carriage stops, having been raised only half its retractive stroke. The upper end of the latch 105, however, is now projecting into the carriage stop path, see Figure 18. It will be noted that the spring 74 is relatively stronger than spring 108 so as to overcome the tension of the latter in raising the latch 105, as described.

To complete the margin-release operation when the carriage is at line-end position, it is only necessary to press and release the button 98, in that the counterstop, having been in the Figure 12, position, is swung by its spring 74 to the opposite side of the margin stop. At the beginning-of-line position, Figure 13, it is necessary to hold the button 98 down while the carriage is moved to its extreme rightward position, in order to get the margin stop at the opposite side of the counterstop. This mode of operation, however, is desirable in that the carriage should be moved to its rightward limit for any typing in the left-hand margin.

Figure 20:
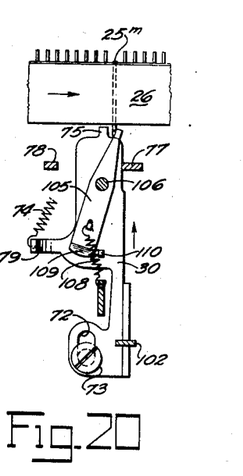
Figure 20 is a view similar to Figure 19 but illustrating the initial stage of restoring the counterstop and after typing beyond the left margin.
Figure 21:
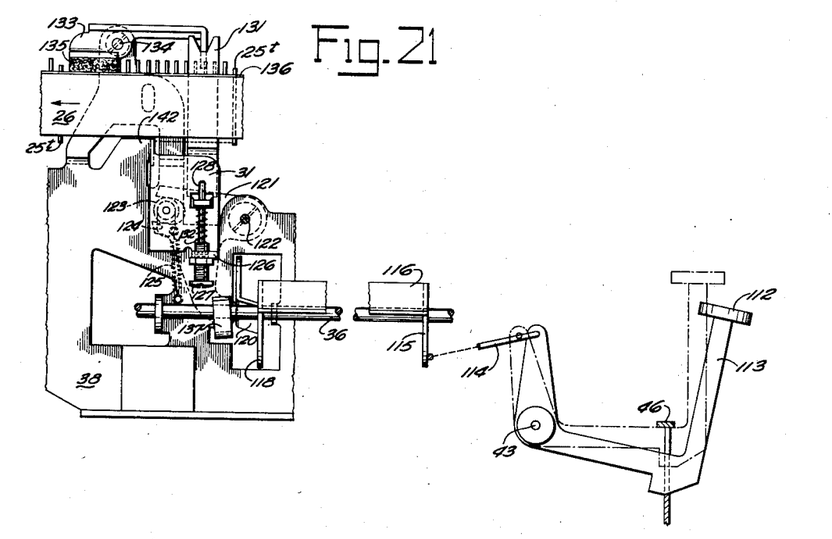

To restore the carriage to within the line-typing zone, the carriage is moved from either of the margin-typing positions and the stop $25^m$ is thus carried past the retracted counterstop 30. The margin stop thus engages the upper end of the latch 105, swinging same laterally on its stud 106 until the catch 110 is freed from the bottom end of the latch, see Figure 20. The counterstop 30 is thus released to be restored by its spring 74 to its normal, raised position in the path of the margin stops. When clear of catch 110, latch 105 under influence of its spring 108, is pulled downwardly until the stud 106 bottoms in its slot, the spring 108 also acting to restore the latch to normal, upright position. The action of the mechanism in tripping the latch is substantially the same whether restoring the carriage from the left or right margin-typing position.

*Tabulating*

Figure 6:
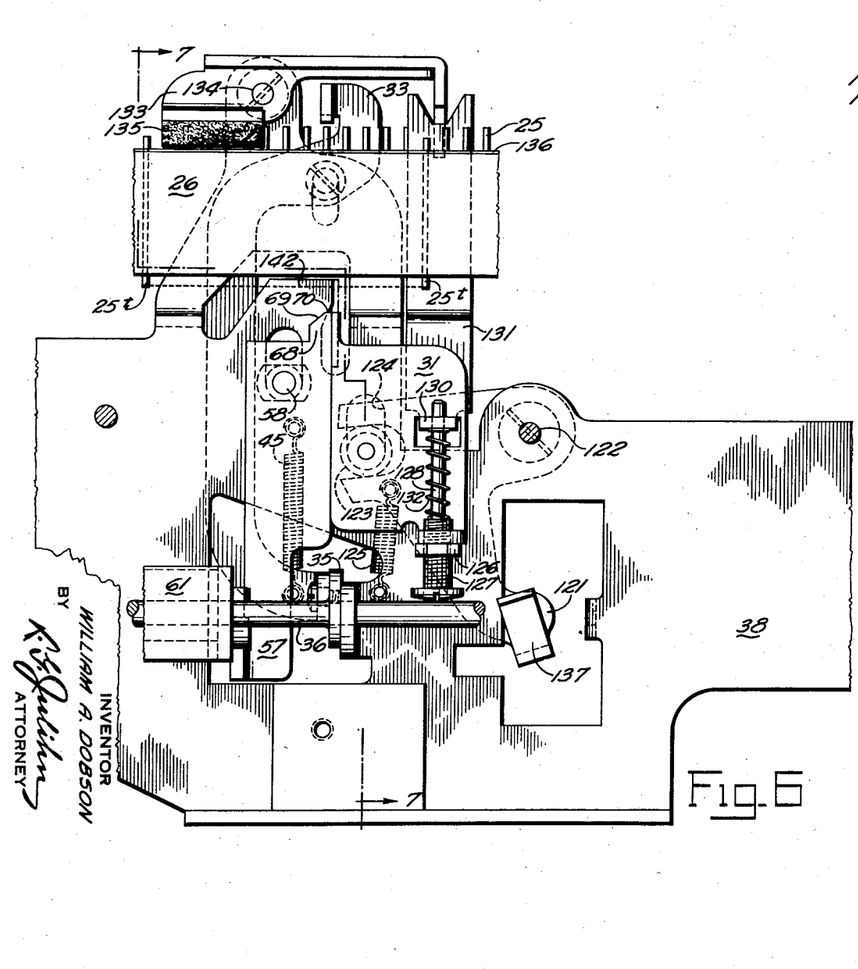
Figure 6 is an enlarged front elevational view of the tabulator mechanism, showing also the stop setter and restorer elements, with associated mechanisms omitted to facilitate illustration.

The carriage is tabulated to each column position at which a stop 25 has been set for tabulating, by pressing a tabulator key 112 which releases the carriage for a tabulating run and raises the tabulator counterstop 31 to effective position in the path of the carriage stops. As shown in Figure 1, the key 112 is carried on a lever 113 pivoted at 43 and connected by a link 114 to an arm 115 of a rockable member 116 rotatable on the shaft 36. A spring 117 acting on the member 116 restores the mechanism to normal position at which lever 113 engages the fixed member 46, see Figure 21. A second arm 118 on the member 116 projects through an opening in the plate 38 and carries a cam 120 cooperative with a bell crank 121 pivoted at 122 on the back of plate 38, Figures 6 and 7. A forked portion of the bell crank cooperates with a roller 123 carried on the tabulator counter stop 31 and projecting through an elongate slot 124 in the plate, which slot affords a guide for the counterstop and determines its normal and projected positions. The counterstop is further guided in an up-and-down direction by a sliding contact edgewise with the stop restorer 57, with which it is in coplanar relation. A spring 125 restores the counterstop 31 and a bell crank 121 to normal, inactive position.

The counterstop 31 includes a threaded ear 126 carrying a screw 127 from which a rod 128 projects through an ear 130 of a brake plunger 131. A spring 132, backed by the screw 127, presses against the brake plunger ear 130, forming a yieldable connection between the counterstop 31 and said plunger. A lever 133 pivoted at 134, has one end engageable by a forked portion of the plunger 131 and carries a brake shoe 135 adapted to be brought into pressure engagement with a strap 136 secured to the stop rack bar 26, to retard carriage travel during the tabulating run.

In the present embodiment of the invention, the carriage is released for a tabulating run by withdrawing a holding dog of the letter-feed escapement. As shown best in Figures 3, 22 and 23, a finger 137 projecting from the bell crank 121 is engageable with a lever 138 pivoted at 139 on the plate 20 and has a finger 140 reaching through the plate and engageable with a holding dog 141 of the escapement, see Figures 22 and 23.

When the tabulating key 112 is pressed, the resultant leftward movement of finger 137 swings lever 138 and thus withdraws the holding dog 141 from the ratchet wheel, thereby releasing the carriage for a tabulating run under influence of the spring drum 16. At the same time, the tabulating mechanism is actuated, as illustrated in Figure 21, to raise the counterstop 31 to tabulator-stop-intercepting position preparatory to banking the carriage at the column determined by the set tabulator stop $25^t$. In the tabulating run, the carriage is moving leftward, as indicated by the arrow, and the stop $25^t$ is, therefore, approaching the counterstop. As the carriage is released, the raising of the counterstop 31 actuates the brake mechanism, in that the resultant compression of spring 132 presses the brake shoe 135 against the stop rack 26 to retard the momentum of the carriage. Upon release of the tabulator key 112, the counterstop 31 is retracted by spring 125, thus releasing the brake mechanism and at the same time restoring the carriage to the control of the letter-feed mechanism by releasing the holding dog 141. The machine is thus conditioned for a succeeding tabulating operation, or for further line typing, as required.

Figure 7:
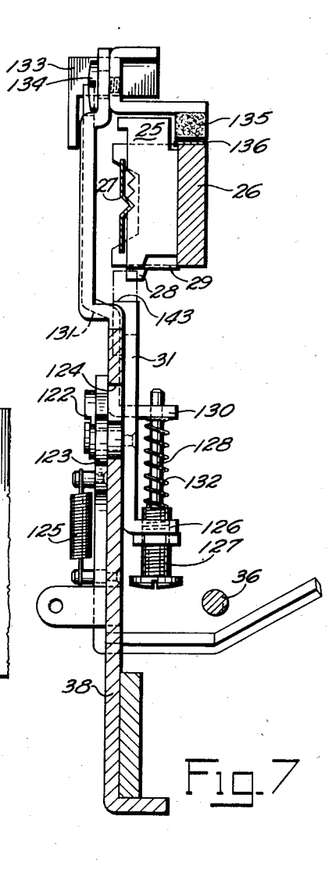
Figure 7 is a transverse sectional view through the tabulator mechanism, taken on the staggered line 7—7 of Figure 6, but omitting the stop setter.

In banking the carriage at a selected column, the tabulator stop imparts a heavy impact to the counterstop 31 which, in projected position, is backed by a member 142 of the back plate. The portion of the counterstop 31 with which the tabulator stops engage is necessarily of a minimum width to engage between two adjacent set stops. This engaging portion is, therefore, in the form of a thin projection 143 which, as shown in Figure 7, extends beyond the rear face of the counterstop and thus overlies the side of the plate member 142.

*Conclusion*

It will be apparent from the foregoing that the invention provides simple and reliably operative means by which a set stop 25 may be adapted for either left or right-hand margin gaging by appropriate movement of the carriage. Said means, as embodied in the buttress 80 in association with the margin counterstop 30, accommodates use of a single series of stops 25 which may be identical in shape throughout the extent of the carriage run and may assume identical set positions on the stop rack 26 whether set for right or left-hand margin gaging. The key-operable stop-setting mechanism is of simple form, comprising mainly a single stop setter and a single operating key to be operated in a like manner whether for setting a right or a left stop. The stops are selectable by positioning the carriage and the stop setter is, therefore, arranged to operate at a given point in the range of carriage travel, said point or setting station having a fixed relation with the printing point of the machine. The aforementioned features of the stop organization accommodate the simple stop-setting mechanism in that only a single stop setter is required and any of the stops may be set to identical effective positions. Upon setting any of the stops positioned at said station by carriage travel, the direction of subsequent carriage movement determines the side of the counterstop at which the set stop is finally disposed, and thus adapts the set stop for gaging a certain margin, either right or left. The use of uniform stops throughout permits selection of any two stops of the entire series to gage a desired line length, so that no limitations need to be countenanced, either as to the length of the selected line or as to the position of said line in the range of carriage travel. While the stop-adapting mechanism, as embodied in the buttress device, is particularly suited for key-settable carriage stop mechanisms, it will be observed that same is suitable as well to carriage stop mechanisms having other means of selectively setting the stops.

What is claimed is:

1. In a typewriter having a frame and a carriage movable in opposite directions on the frame, a series of settable stops and a counterstop mounted, one on the frame and the other on the carriage, the stops of the series being arranged for setting individually to effective position, means to individually set said stops, and means, conditioned by the setting of a stop, operable upon moving the carriage and selective according to the direction of carriage movement, to determine alternative relative positions of the set stop and the counterstop, thus to limit carriage movement in a selected direction.

2. In a typewriter having a frame and a carriage movable in opposite directions on the frame, a series of settable stops and a normally effective counterstop mounted, one on the frame and the other on the carriage, the stops of said series being arranged for setting individually to effective position, means to individually set said stops, means active upon setting a stop of said series, to render said counterstop ineffective, and means to render the second-named means inactive in response to relative movement of the set stop and counterstop in one direction or the other after stop setting, to free the counterstop for restoration in a selective relation to the set stop.

3. In a typewriter having a frame and a carriage movable in opposite directions on the frame, a series of settable stops and a normally effective, retractable counterstop, one mounted on the frame and the other mounted on the carriage, the stops of the series being arranged for setting individually to effective position, means to individually set said stops, means active upon setting a stop, to retract the counterstop, and means to render the second-named means inactive upon relative movement of the set stop and counterstop in one direction or the other after stop setting, to free the counterstop for restoration in a selective relation to the set stop.

4. In a typewriter having a frame and a carriage movable in opposite directions on the frame, a series of settable stops and a normally effective, retractable counterstop, one mounted on the frame and the other mounted on the carriage, the stops of the series being arranged for setting individually to effective position, and means engageable by a stop of said series being set, to retract the counterstop, said means being disengageable by the set stop in relative movement of the counterstop and stop series, to release the counterstop for restoration to effective position at a selective side of the set stop, in accordance with the direction of carriage travel after setting the stop.

5. In a typewriter having a reciprocatory, letter-feed controlled carriage, in combination, a series of selectively settable stops arranged at letter-space intervals on the carriage for setting to effective position, key-operable means for seting said stops individually, a counterstop normally urged to effective position in the path of the set stops, and means, operable by a stop being set, for retracting the counterstop incident to operation of said stop-setting means, said retracting means being disabled upon movement of the carriage, to release the counterstop for restoration into the stop path selectively at either side of the set stop, depending upon the direction of movement of the carriage after stop setting.

6. In a typewriter having a reciprocatory, letter-feed controlled carriage, in combination, a series of selectively settable stops arranged at letter-space intervals on the carriage for setting to effective position, key-operable means for setting any one of said stops, positioned by carriage movement, at a stop-setting station, a counterstop normally urged to effective position in the path of the set stops, and a movable member arranged at said station for engagement by a stop being set and operatively connected to said counterstop to retract the counterstop incident to stop setting, said member being disengageable by the set stop upon movement of the carriage after stop setting, to release the counterstop for restoration into the stop path selectively at either side of the set stop, depending upon the direction of carriage movement after stop setting.

7. In a typewriter having a reciprocatory, letter-feed controlled carriage, in combination, a series of selectively settable stops arranged at letter-space intervals on the carriage for setting to effective position, key-operable means for setting any one of said stops, positioned by carriage movement, at a stop-setting station, a counterstop normaly urged to effective position in the path of the set stops, and a member carried on said counterstop and disposed at said station for engagement by a stop being set, to retract the counterstop out of the stop path, said member being releasable upon movement of the stop incident to carriage travel, to free the counterstop for restoration into the stop path selectively at either side of the set stop, depending upon the direction of carriage travel after stop setting.

8. In a typewriter having a reciprocatory, letter-feed controlled carriage, in combination, a series of selectively settable stops arranged at letter-space intervals on the carriage for setting to effective position, key-operable means for setting any one of said stops, positioned by carriage movement, at a stop-setting station, a counterstop normally urged to effective position in the path of the set stops at one side of said station, a member movably carried on said counterstop and projecting into said station for engagement by a stop being set, to retract the counterstop out of the stop path, said member being releasable from the set stop upon movement of said stop incident to carriage travel, to free the counterstop for restoration into the stop path selectively at either side of the set stop, depending upon the direction of carriage travel after stop setting.

9. In a typewriter having a reciprocatory, letter-feed controlled carriage, in combination, a series of selectively settable stops arranged at letter-space intervals on the carriage for setting to effective position, key-operable means for setting any one of said stops, positioned by carriage movement, at a stop-setting station, a counterstop normally urged to effective position in the path of the set stops at one side of said station, a member pivoted on said counterstop and yieldably held in normal position at which said member projects into said station for engagement by a stop being set, said member being effective to retract the counterstop incident to stop setting and to free the counterstop, upon movement of the set stop incident to carriage travel, for restoration into the stop path selectively at either side of the set stop, depending upon the direction of carriage movement after stop setting.

10. In a typewriter having a reciprocatory, letter-feed controlled carriage, in combination, a series of selectively settable stops arranged at letter-space intervals on the carriage for setting to effective position, key-operable means for setting any one of said stops, positioned by carriage movement, at a stop-setting station, a counterstop normally urged to effective position in the path of the set stops at one side of said station, a fan-shaped buttress pivoted on said counterstop and having an arcuate edge overlying the counterstop end, means yieldably holding said buttress in normal position at which the arcuate edge projects into said station for engagement by a stop being set, to thereby retract the counterstop from the stop path, said buttress being effective to hold the counterstop retracted until movement of the carriage after stop setting moves the set stop out of the station to either side of the counterstop, to release the counterstop for restoration into the stop path selectively at either side of the set stop, depending upon the direction of carriage movement after stop setting.

WILLIAM A. DOBSON.